Figure 1:
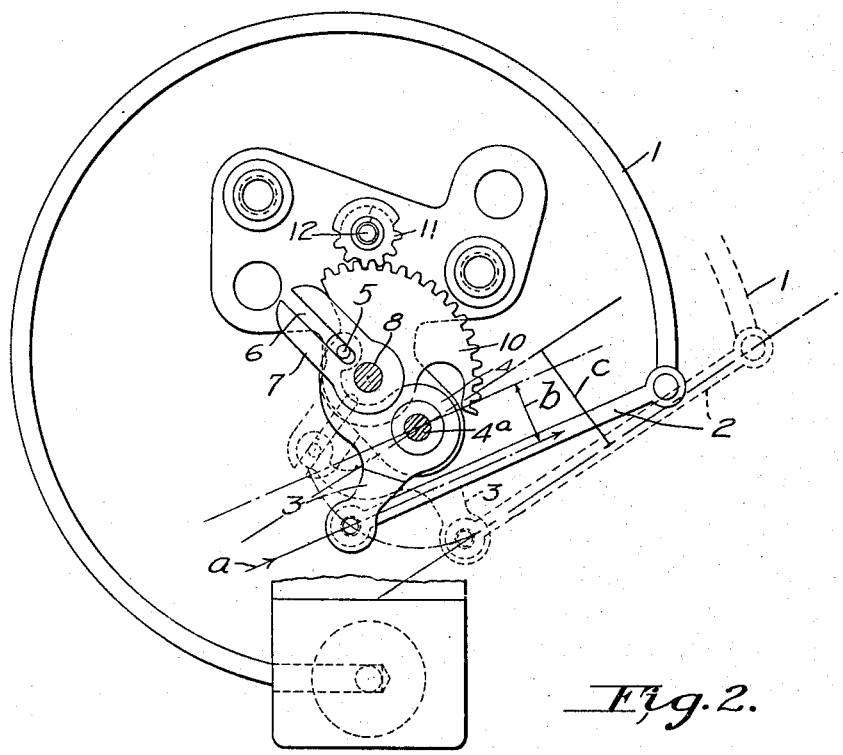

March 17, 1936.  M. E. CHENEY ET AL  2,034,606

VAPOR PRESSURE GAUGE

Filed Jan. 1, 1929

Inventors
Moses E. Cheney
Adrian P. Brietzke

By Attorneys
Nathan & Bowman

Patented Mar. 17, 1936

2,034,606

UNITED STATES PATENT OFFICE 2,034,606

VAPOR PRESSURE GAUGE

Moses E. Cheney and Adrian P. Brietzke, La Crosse, Wis., assignors, by mesne assignments, to Moto Meter Gauge & Equipment Corporation, a corporation of Delaware (1935)

Application January 1, 1929, Serial No. 329,681

5 Claims. (Cl. 73—109)

This improvement relates to vapor pressure gauges and is particularly concerned with improved intermediate connecting devices that are positioned between the pressure tube and the pointer of the gauge. The invention is particularly adapted to gauges of the Bourdon type.

A main object of the invention is to devise such a train of mechanism as will give a desirable progressive retarding effect to the pointer, whereby a more symmetrical scale can be used. In this manner the objectionable form of non-uniform graduations marked on the scale can be overcome to a great extent, it being understood that in vapor pressure gauges the increment of pressure between 0 and 10° C. is often very much less than between 90 and 100 C.

In a general way, the improvement can be said to reside in giving to the pointer a two fold reducing or retarding effect, as the pointer advances from a position indicating the minimum degree of temperature and subject to the minimum increment of pressure, to a position indicating the maximum temperature and where it is subject to the maximum increment of pressure. This result is obtained through the variable leverage between a driving means and a driven member having a slot and pin connection, together with a crank arm and connecting link working through a large angle from substantially dead center, these parts being so arranged in their relation to each other between the free end of the Bourdon tube and the pointer that at zero temperature or minimum pressure position, the pin on the driving means will be in a position to move substantially at right angles to the slot of the driven member and the relative lengths of the arms will be such as to produce a high mechanical advantage between the driving means and the driven member, while the crank arm will be near dead center, thereby giving the most effective pointer movement, whereas at the maximum temperature position, the pin will be in a position to move on a radial line with the slot while the mechanical advantage is reduced by a change in the relative length of the members, the movement being still further reduced by the crank arm operating near the center of its throw. In this way the increased increment of pressure at the high point of the scale will transmit substantially the same movement to the pointer as that produced by a decreased increment of pressure at the low point of the scale. Furthermore, it is an object of the invention to arrange the parts so they can be assembled compactly within a case, having such a gear ratio as to give the pointer the requisite movement to enable a desirable form of scale to be used. To these ends the point of connection between the pressure tube and the intermediate connecting device is arranged to have preferably an arc of movement of substantially 80°.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 2:
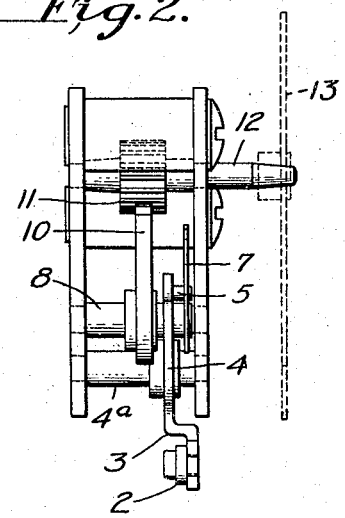

In the drawing Figure 1 is a plan view of the operating mechanism; Fig. 2 is an end view and Fig. 3 is a front view of the dial and pointer.

Referring to Fig. 1, the Bourdon tube is marked 1 and it is anchored securely at one end to a part of the casing (not shown) of the instrument. The free end has pivotally mounted thereon a link 2 which connects with an arm 3 of a bell crank lever or driving means 4 pivotally mounted as at 4ª. A second arm of the lever 4 carries at its outer end a pin 5 which engages a slot 6 formed in an arm 7 of a driven member secured to the rotatable shaft 8. Integral with this shaft 8 is a sector shaped gear member 10 which meshes with a pinion 11 secured to the pointer shaft 12. The pointer 13 is likewise secured to this shaft 12 so that the sector shaped member 10 transmits its movement to said pointer 13.

As appears clearly from Figs. 1 and 2, the pull of the Bourdon tube is in the line indicated by the arrow $a$ so that the crank arm 3 has an increased angular motion in the position shown in full lines ($b$) from that in the other extreme of its movement ($c$), indicated by dotted lines. Likewise, in the position indicated in full lines (Fig. 1) the pin 5 will produce the maximum movement of the member 10 because the movement of the pin will be substantially at right angles to slot 6. Consequently at this point there will be the maximum movement transmitted to the pointer while at the other extreme of movement of the crank arm 3 the pin 5 will move substantially in line with said slot 6 producing a minimum of movement of member 10 and at this point there will be a further reduction due to the decreased angular travel of the crank arm at this point heretofore referred to.

Figure 3:
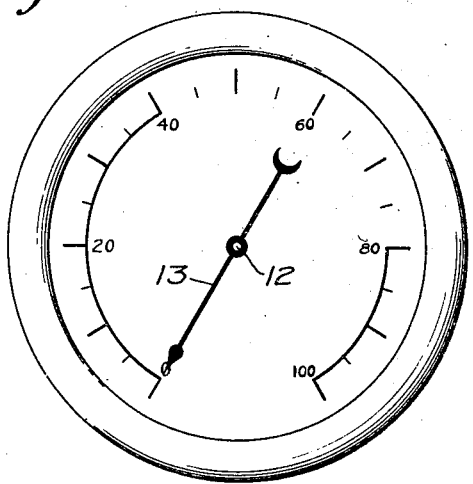

As the increment of pressure near the zero or low point of the scale is much less than the increment at the high point of the scale, this two fold reduction will compensate for the increased increment at the high point of the scale and permit of substantially uniform graduations of the dial, such as shown in Fig. 3.

In order to obtain the proper angular travel of the crank arm 3 and pin 5, and so calibrate the instrument, the respective arms of the member 4 may be manually moved nearer to or further away from the pivot 4a, or moved clockwise or anti-clockwise, the amount and direction of movement being determined after the instrument has been tested. A still further adjustment may be made by giving to the link 2 a slight bend which would move both of the pivots of the link 2 closer together. No attempt has been made to show the different adjustment means that can be employed. However, as the adjustment mechanisms for calibrating the instrument form a part of all gauges of this Bourdon tube type detailed description and illustration thereof is deemed unnecessary.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. The combination in an indicator having a movable pointer of a pivoted driven member having a slot therein, means connecting said driven member and said pointer, a driving member pivoted eccentrically to said driven member, a Bourdon tube, means operatively connecting said Bourdon tube and driving member and a pin on said driving member engaging in the slot in said driven member, said pin and slot connection being arranged so said pin moves continuously outwardly in said slot and away from the line through the centers of rotation of said driving and driven members to effect continuously decreasing relative angular movement of said driven member with respect to said driving member as said Bourdon tube moves under increasing pressure.

2. The combination in an indicator having a movable pointer of a pivoted driven member having a slot therein, means operatively connecting said driven member and pointer, a driving member pivoting about a center offset from the center of said driven member and having arms diverging from its pivot, a pin in one of said arms engaging in the slot in said driven member, a Bourdon tube and means connecting said Bourdon tube and the other arm of said driving member, said slot being arranged to be moved continuously on one side of the line through the centers of rotation of said driving and driven members as said Bourdon tube moves under increasing pressure and said pin and slot connection being arranged to effect a continuously decreasing relative angular movement of said driven member with respect to said driving member.

3. The combination in an indicator having a movable pointer of a pivoted driven member having a slot therein, means operatively connecting said driven member and said pointer, a bell crank driving member pivoting about a center offset from the center of said driven member and having a pin on one of its arms engaging in the slot in said driven member, a Bourdon tube and means connecting said Bourdon tube to the other arm of said driving member, said slot being arranged to be moved continuously on one side of the line through the centers of rotation of said driving and driven members as said Bourdon tube moves under increasing pressure and said pin and slot connection being arranged to effect a continuously decreasing relative angular movement of said driven member with respect to said driving member.

4. In an indicator having a movable pointer and a Bourdon tube moving in response to variations in the vapor tension with changes in the temperature to be indicated, means connecting said Bourdon tube and pointer to move said pointer proportionately to the changes in temperature to be indicated comprising a pivotally mounted driven member having a slot extending radially of the driven member, means operatively connecting said driven member and pointer, a driving member pivoting about a center offset from the center of rotation of said driven member, a pin on said driving member engaging in said slot and a link connecting said Bourdon tube and driving member, said link being arranged to operate said driving member through a gradually increasing effective lever arm and said pin and slot connection being arranged to move continuously on one side of the line joining the centers of rotation of said driving and driven members and to provide a gradually decreasing relative angular movement of said driven member with respect to said driving member as increasing temperature subjects said Bourdon tube to increasing vapor tension.

5. The combination in an indicator having a pointer movable between low and high indicating limits of a pivoted driven member having a radial slot therein, means connecting said driven member and pointer, a driving member pivoted eccentrically to said driven member, the longitudinal axis of said slot extending in the same direction as the line passing through the centers of rotation of said driving and driven members when the pointer is in zero position, a pin on said driving member engaging in the slot in said driven member, a Bourdon tube and means operatively connecting said Bourdon tube and driving member, the pin and slot connection between the driving and driven member being such that there will be a decreasing rate of movement of the pointer upon increased expansion of the Bourdon tube.

MOSES E. CHENEY.
ADRIAN P. BRIETZKE.